(12) United States Patent
Neubauer et al.

(10) Patent No.: US 7,134,467 B2
(45) Date of Patent: Nov. 14, 2006

(54) LOW NET TO GROSS OTR TIRE

(75) Inventors: Robert Anthony Neubauer, Medina, OH (US); Mark Henry Mineur, Hudson, OH (US); Timothy Patrick Lovell, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 143 days.

(21) Appl. No.: 10/740,866

(22) Filed: Dec. 19, 2003

(65) Prior Publication Data

US 2005/0133141 A1    Jun. 23, 2005

(51) Int. Cl.
*B60C 11/11* (2006.01)

(52) U.S. Cl. ............ 152/209.12; 152/209.13; 152/209.22; 152/902

(58) Field of Classification Search .......... 152/209.12, 152/209.13, 209.22, 902
See application file for complete search history.

(56) References Cited

U.S. PATENT DOCUMENTS

| | | | | |
|---|---|---|---|---|
| D155,065 S | * | 9/1949 | Bete | D12/544 |
| 3,237,669 A | * | 3/1966 | Travers | 152/209.22 |
| 5,411,067 A | * | 5/1995 | Beeghly et al. | 152/209.12 |
| 5,464,050 A | | 11/1995 | Bonko | 152/209 B |
| 5,843,248 A | | 12/1998 | Baus et al. | 152/209 B |
| 6,209,602 B1 | * | 4/2001 | Bonko | 152/209.12 |
| 6,263,933 B1 | | 7/2001 | Baus | 152/209.12 |
| 6,957,676 B1 | * | 10/2005 | Bettiol et al. | 152/209.22 |
| 2003/0056867 A1 | | 3/2003 | Bettiol et al. | 152/209.18 |

FOREIGN PATENT DOCUMENTS

| | | | |
|---|---|---|---|
| GB | 1587963 | * | 4/1981 |
| JP | 11-222009 | | 8/1999 |
| JP | 2000-177328 | | 6/2000 |
| WO | WO 01/39994 | * | 6/2001 |

OTHER PUBLICATIONS

Machine translation for Japan 2000-177328.*
European Search Report, completed Apr. 4, 2006.
Patent Abstracts of Japan, Publication No. 11222009, Publication Date Aug. 17, 1999.
Patent Abstracts of Japan, Publication No. 2000177328, Publication Date Jun. 27, 2000.

* cited by examiner

*Primary Examiner*—Steven D. Maki
(74) *Attorney, Agent, or Firm*—Richard B. O'Planick

(57) ABSTRACT

A pneumatic off-the-road (OTR) tire has a plurality of central and shoulder lugs. The central lugs are arranged in a circumferentially continuous row and extend across the equatorial plane (EP). Each central lug is similar in shape and orientation relative to each circumferentially adjacent central lug. The tire is conformed having a tread package that effects a low net-to-gross ratio of less than 40% as measured around the circumference of the tire. The low net to gross tread pattern is incorporated into a relatively low aspect ratio OTR tire for construction and industrial applications.

13 Claims, 4 Drawing Sheets

LOW NET TO GROSS OTR TIRE

FIELD OF THE INVENTION

This invention relates to a pneumatic tire for a construction-type off-the-road vehicle.

BACKGROUND OF THE INVENTION

Off road vehicles for construction or general commercial applications encounter rigorous service requirements. The tires for such vehicles are required to accommodate high loads and exposure to large amounts of debris, hard packed soil conditions and adverse operating conditions. The vehicles to which the tires are mounted may be large earthmovers that must traverse gravel, broken concrete, or hard packed dirt in the course of normal service duty. It is desirable, therefore, for the tires of such vehicles to be self-cleaning.

The tread region in tires for such applications must have a large height difference between the top and bottom of lugs to provide the necessary traction. A typical tire size may be an 875/65R29, referred to herein as a "65 Series" tire. This tire when produced in a radial construction will have a carcass with a plurality of plies and of belt reinforcement. The tire operates at a relatively high inflation pressure in order to accommodate the load requirements.

Heretofore, the tire industry has attempted to service the industrial/construction/OTR segment of the market with extremely high traction requirements by the placement of agricultural tires in such applications. U.S. Pat. No. 6,263,933 B1, incorporated by reference herein, discloses such an agricultural tire. The tire has a tread package that provides a relatively low Net-to-gross Ratio. While such agricultural tires are adequate from a traction perspective, they are not robust enough to withstand the loads at speeds necessary in the industrial/construction OTR applications.

Available OTR tires have constructions that, while robust enough to handle the loads and speeds necessary in the industrial construction/OTR applications, typically have a tread pattern with a substantially higher net-to-gross ratio for the loads and speeds encountered. Additionally, conventional OTR tires that are typically sized with an aspect ratio in the 85% to 100% range and widebase OTR tires that are typically sized with an aspect ratio in the 75% to 85% range, do not provide adequate flotation and traction for such applications.

Moreover, OTR tires, as opposed to over the highway tires or agricultural tires, generally are available in aspect ratios over 70%. There are relatively few sizes currently available to the industry in aspect ratios of 65% or below.

Accordingly, there has been an ongoing need for an OTR tire that provides a low net-to-gross tread pattern in construction/industrial/OTR applications on relatively low aspect ratio OTR tires. An adequately low net-to-gross ratio allows the tire to be self-cleaning so as to satisfactorily perform in the work environment described above.

SUMMARY OF THE INVENTION

A low net-to-gross radial ply pneumatic tire tread pattern in a relatively low aspect ratio is disclosed for use in construction/industrial/OTR applications. The tire has a casing, the casing having at least one ply reinforced by rubber coated cords, a pair of annular extending bead cores, the at least one ply being wrapped about each bead core and extending therebetween, a belt reinforcing structure reinforced with rubber treated steel cords, and a tread disposed radially outward of the casing. The tread has an inner tread base, two lateral edges. The halfway location between the lateral edges defines the tread equatorial plane EP and a plurality of lugs extend radially outwardly from the inner tread base 34. The tread 32 features three rows of lugs. A first row extends axially inwardly from an opposite or a first shoulder region of the tread. A second row extends axially inwardly from a second shoulder region of the tread. A central row is positioned between the first and second rows. The lugs of the first row are similar in shape but opposite in orientation relative to the lugs of the second row. Each lug of the first row lies within a first tread half. Each lug of the second row lies within a second tread half. The lugs of the central row lie in both the first tread half and second tread half. All lugs have a leading edge and a trailing edge.

Preferably the central lug has enlarged lug head portions extending from both the leading edge and the trailing edge, both enlarged lug head portions intersecting the equatorial center plane EP of the tire.

More preferably, the trailing enlarged lug head of a central lug is connected to a leading enlarged lug head of a circumferentially adjacent central lug head by a reduced height tie bar. A tie bar also extends between the axially adjacent lugs of the first and second rows and the lugs of the central row, the tie bar having a radial height of at least one half the lug height.

Each lug of the first and second rows is further configured having at least one transverse bar dividing the lug into at least two component parts. Each transverse bar has a radial height of at least one half the lug height.

The radial ply pneumatic tire according to the invention has a relatively low net-to-gross ratio as measured around the circumference of the tire less than 40%, and preferably 36%. Additionally, in the preferred embodiment, the tire is conformed to have a relatively low aspect ratio than tires typically used in construction/industrial/OTR applications. Still further, the tire is constructed having a reinforcement belt structure of steel composition to provide the requisite strength and durability for the intended applications.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17E to 27E with respect to the equatorial plane of the tire.

"Bias Ply Tire" means that the reinforcing cords in the carcass ply extend diagonally across the tire from bead-to-bead at about a 25–65E angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross Ratio" means the ratio of the surface are of the normally loaded and normally inflated tire tread rubber that makes contact with a hard flat surface, divided by the total area of the tread, including non-contacting portions such as grooves as measured around the entire circumference of the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65E and 90E with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with respect to a series of such parts or portions during rotation of the tire in the direction of travel.

"Tread Arc Width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit Tread Pressure" means the radial load borne per unit area (square centimeter or square inch) of the tread surface when that area is in the footprint of the normally inflated and normally loaded tire.

BRIEF DESCRIPTION OF THE DRAWINGS

The invention will be described by way of example and with reference to the accompanying drawings in which.

DETAILED DESCRIPTION OF THE INVENTION

FIGS. 1–4 show a tire of a type and size for general use at loads and speeds typically encountered in construction/industrial/OTR applications. The tire shown is a 65 Series tire having a relatively low aspect ratio (defined as the ratio of a tire's section height to its section width) of 65%. While such a ratio is preferred, the ratio may be varied according to the application and preference of the user without departing from the scope and spirit of the invention.

The tire has a casing having one or more carcass plies extending circumferentially about the axis rotation of the tire. The tire preferably has 3 to 4 cord reinforced plies having synthetic nylon or polyester cords. The carcass plies are anchored around a pair of substantially inextensible annular beads. A belt-reinforcing member has one or more belt plies disposed radially outward from the carcass plies. Preferably four belts are employed. The belts are of an ultra high tensile monofilament steel cord reinforcement. These belt plies provide reinforcement for the crown region of the tire 20. A circumferentially extending tread 32 is located radially outwardly of the belt reinforcing structure.

A sidewall portion extends radially inwardly from each axial or lateral tread edge 33A,33B of the tread to an annular bead portion having the beads located therein. Carcass plies preferably have the cords oriented radially. The number of plies depends on the load carrying requirements of the tire. The figures illustrate the preferred tread pattern made in a non-directional fashion.

Figure 1:
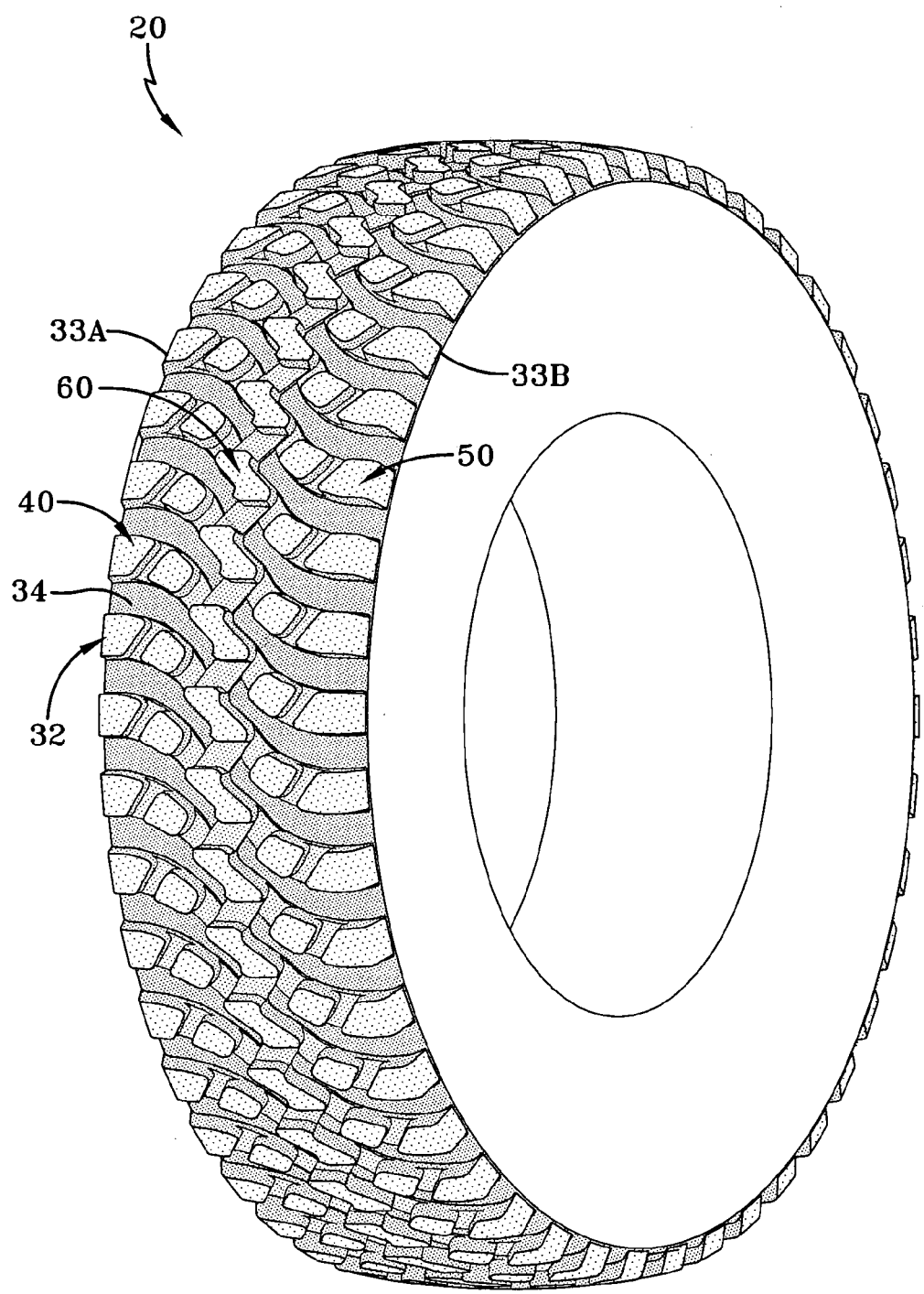
FIG. 1 is a perspective view of a first embodiment tire according to the invention.
Figure 2:
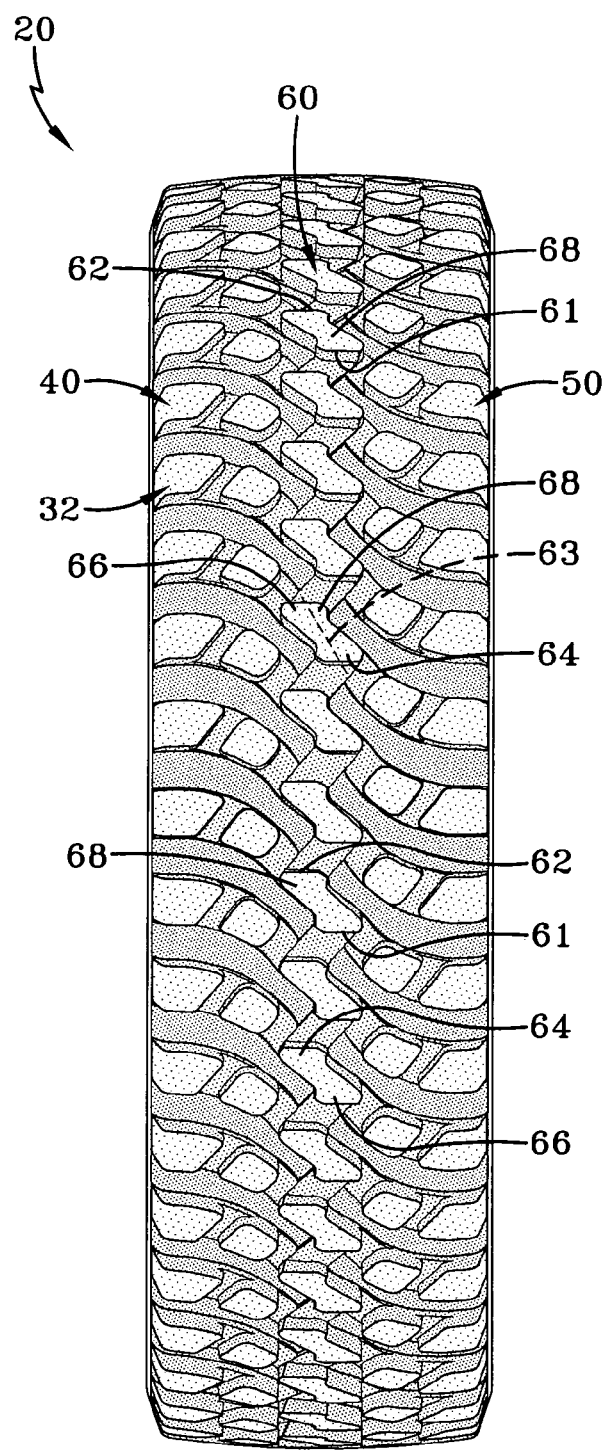
FIG. 2 is a plan end view of the tire of FIG. 1.
Figure 3:
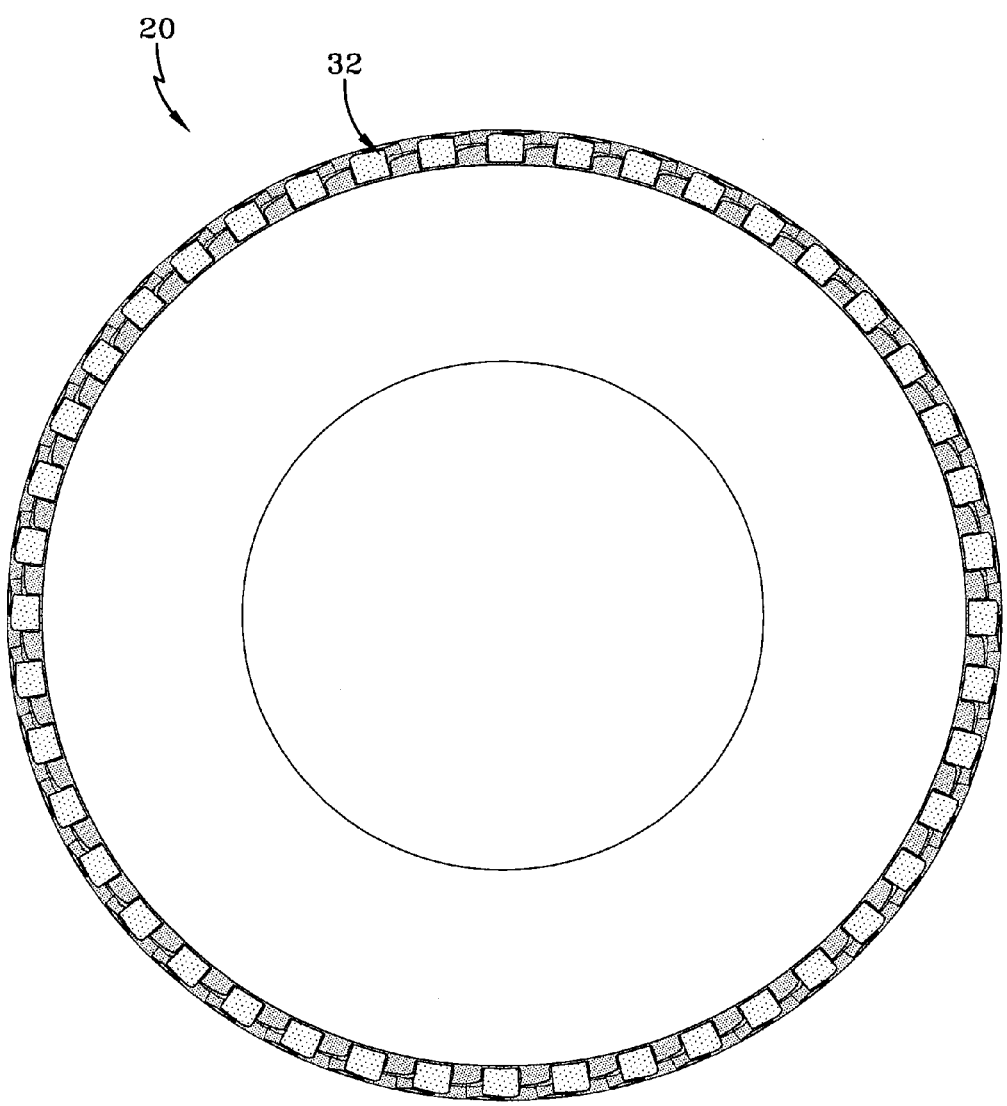
FIG. 3 is a cross-sectional view of the tire taken along lines 3—3 of FIG. 1.

Now referring to FIG. 1, a tire 20 according to the present invention, is illustrated. The tire 20 according to the present invention as a unique non-directional tread 32. The tread 32 has a first tread edge 33A and a second tread edge 33B. Disposed between the tread edges 33A and 33B are an inner tread 34 and a plurality of lugs 40,50 and 60 extending radially outwardly from the inner tread 34. As illustrated in FIG. 2 each central lug 60 has a radially outer surface 68, a leading first edge 61, a trailing second edge 62, and a centerline 63 between the first and second edges. Each central lug 60 extends generally circumferential from an enlarged lug head portion 64 to a trailing enlarged lug head portion 66.

The central lugs 60 are arranged in a circumferentially repeating row of lugs 60, each lug 60 extends crossing the equatorial plane (EP). The circumferentially adjacent central lugs 60 are similarly oriented. Each lug 60 preferably lies equally within each of the respective tread halves. The leading edges 61 as shown lie entirely within tread half while the trailing edges 62 lie entirely the tread half. These central lugs 60 have an enlarged lug heads 64,66 at both the trailing and leading ends 61,62 of the lug 60. The average width of the lugs 60 is slightly enlarged relative to the average width of the shoulder lugs 40,50. This enlarged central lug 60 is extremely durable and provides excellent traction and ride performance. As shown, the leading edge 61 and trailing edge 62 of each central lug 60 is linear and oriented transversely to the tread 32.

Figure 4:
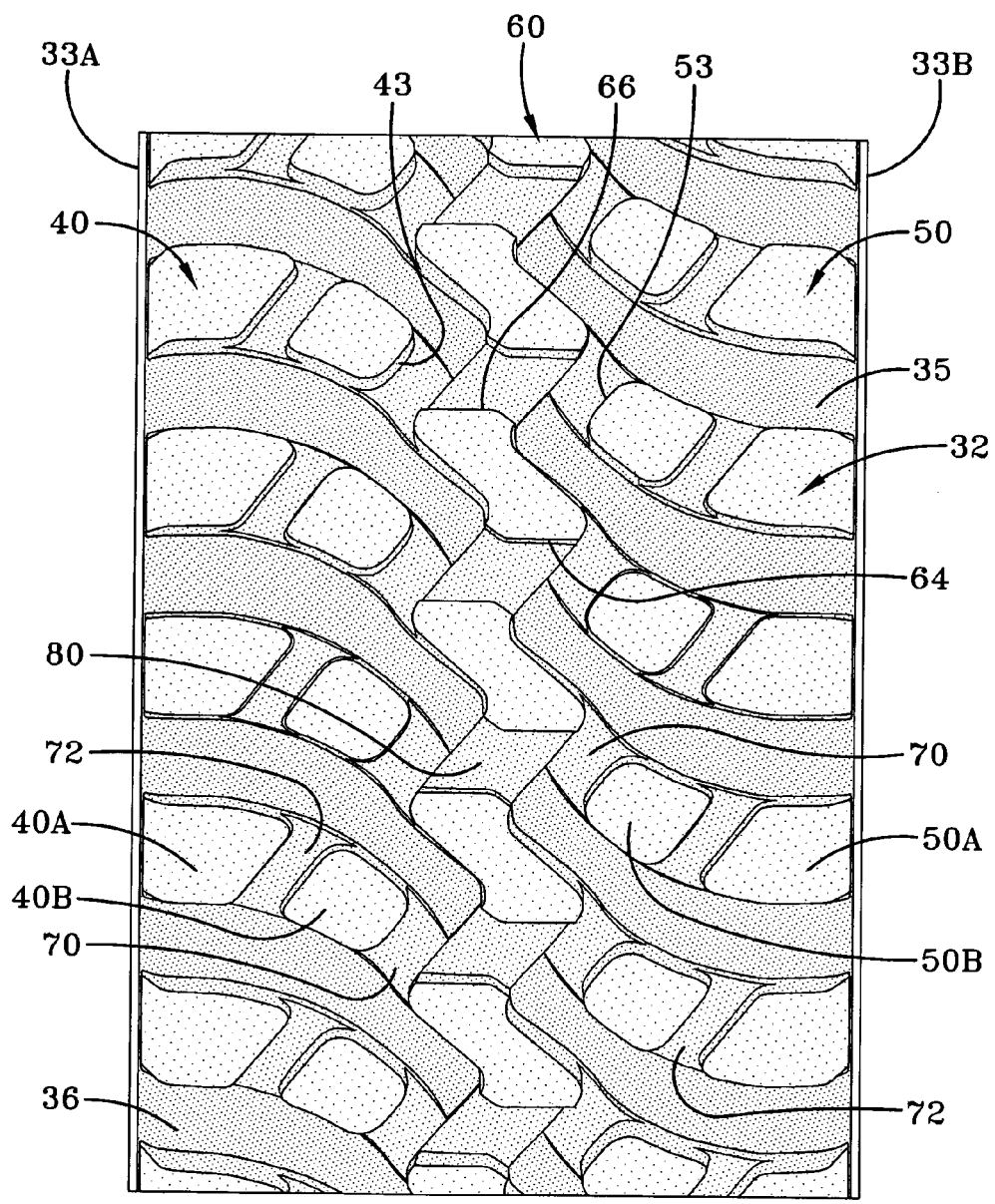
FIG. 4 is an enlarged perspective fragmentary view of a portion of the tread of the tire taken from FIG. 2.

The ride performance and traction capabilities is further enhanced by the employment of a plurality of shoulder lugs 40,50 which extend from each respective tread edge 33A or 33B and lie entirely within their respective tread half. The shoulder lugs 40 and 50 have a total lug length $L_1$ about equal to the total lug length $L_1$ of the central lug 60. As shown, the shoulder lugs have a lug length of about 10 to 30% of the tread width. The shoulder lugs 40,50 are divided into two rows. As seen best from FIG. 4, the first row of shoulder lugs 40 has an axially inner end 43 that is located substantially circumferentially aligned with the axially inner ends 53 of the second row of lugs 50. The second row of shoulder lugs 50 extend from the tread edge 33B and have a length substantially equal to the length of the first row of shoulder lugs 40. The second row of shoulder lugs 50 has an axially inner end 53 that is circumferentially located generally aligned with the axially inner ends 43 of the first row of lugs 40. As shown in FIG. 4, both the first row and second row of shoulder lugs 40,50 have preferably a uniform curvature.

As shown in FIG. 4, the net-to-gross ratio of the tread is less than 40% preferably 36%. The space between the lugs creates large soil discharge channels 35, 36. These channels create a very open tread pattern. The openness of the tread pattern further enhances the self-cleaning properties of the tread 32 keeping it from packing with mud.

It is understood that one can vary the overall shape of the lugs 40,50 and can modify the general orientation or appearance of the lugs without departing from the spirit of the claimed invention which is directed to the novel tread patterns disclosed herein.

With further reference to FIG. 4, the first row and second row of shoulder lugs 40,50 and the central lugs 60 are axially spaced at the outer surface of the lugs 40,50,60 such that the axially inner ends 43,53 of the first and second rows of shoulder lugs 40,50 are axially aligned within each respective row. The leading ends 64 and the trailing ends 66 of the central lugs 60 are also axially aligned with each circumferentially adjacent central lugs respective leading and trailing ends.

With reference to FIGS. 1–4, a tread 32 of the tire 20 is shown having a non-directional tread pattern. The tread 32 of tire 20 has the first row of shoulder lugs 40 oppositely oriented but similarly inclined relative to the shoulder lugs 50 of the opposite row as can be seen from the perspective view of FIG. 1 and the plan view of FIG. 4, the lugs 40 and 50 extend in a substantially curvilinear fashion across the tread 32. In the tire 20 when the tire is normally loaded and inflated, the tread 32 exhibits a net-to-gross ratio of less than 40%, preferably about 36%. The tire 20 exhibits a nominal rim diameter of 29" or less and a tread lug height that is measured from the inner tread 34 to the radially outer surface 68 of the lugs 60 at the equatorial plane of an industry standard commercial off-road tire lug height. For example, in an 875/65R29 GD tire, the nonskid lug depth at the centerline of the tires 20 will be approximately 2.25 inch (57 mm).

Due to the contour of the tread 32 it can easily be appreciated that the center of the tread bears most of the load carrying capacity while the shoulder regions are provided to increase traction and provide additional biting or digging surfaces which provide traction particularly in loose soil or loose debris. It is believed preferable that the tread lugs 40,50 be reasonably braced using generous angles and tie bar bracing 70,80 to further enhance the stiffness of the lugs and to improve its durability.

One novel feature of this non-directional tread pattern of the tire 20 in FIGS. 1–4 is that the lugs 40 of the first row and the lugs 50 of the second row 46 do not axially overlap at the equatorial plane. This was a common feature employed in industrial service R-4 tires of the prior art. Secondarily, the central lugs 60 do not overlap or interlock with either the first or the second rows of shoulder lugs 50. Again, this feature is not believed to have been employed in this type of tire heretofore. The benefit of this feature is that the tread pattern remains relatively open, increasing the overall tractive performance of the tire while not sacrificing the overall ride performance.

An equally important novel feature of the lugs 40,60 and 50,60 is that a leading edge and trailing edges of the shoulder lug and central lugs are of identical linear configuration extending transversely across the tread pattern, normal to the tread edges 33A and 33B.

As further shown in FIG. 4, tie bars 70 of reduced height are disposed between the side lugs 40, 50 and the center lug 60 situated therebetween. Tie bars 80 of reduced height relative to the lug height are disposed between circumferentially adjacent lugs 60. The tie bars 70 in the preferred tire have an approximate radial height equal to 10% of the nominal radial height of lugs 40,50 and the tie bars 80 have a radial height of 25% of the nominal radial height of lugs 40, 50. The 25% height of bars 80 is an approximation and may be nominally increased or decreased without departing from the invention. In addition, transverse bars 72, as best shown in FIG. 4 are further provided, dividing the lugs 40 and 50 into respective lugs 40A, 40B, and 50A, 50B. The additional inclusion of transverse bars 72 further assists in reducing the net to gross ratio to less than 40%. Transverse bars 72 in the preferred tire have an approximate radial height equal to 10% of the nominal height of lugs 40, 50. The 10% height of bars 72 is an approximation and may be nominally increased or decreased without departing from the invention. This insures an additional degree of openness in the lug pattern that reduces the Net-to-gross Ratio and serves to prevent soil packing. The tie bars and transverse bars yield an open somewhat flexible tread with very durable lugs 40,50,60 due to the interconnection of the lugs via the tie bars 70, 80.

From the foregoing, it will be appreciated that the subject invention achieves a tire that has a low net-to-gross tread pattern in a relatively low aspect ratio, defined herein as ranging from 50% to 75% as compared to commonly used OTR used in construction/industrial/OTR applications. The inclusion of tie bars and transverse bars between the three rows of circumferential lugs facilitates achievement of such an objective. Moreover, the tire is provided with a steel support belt structure that will withstand the demands of durability and strength in construction/industrial/OTR applications. While the specific tread pattern described above achieves the objectives stated herein, the invention is not intended to be so limited. Other tread configurations providing a low net-to-gross tread pattern in a steel reinforced, low aspect ratio tire, that will be apparent to those skilled in the art, are intended to be within the scope and spirit of the invention.

What is claimed is:

1. A radial ply pneumatic tire for construction/industrial/OTR applications, the tire having a casing the casing having at least one ply reinforced by rubber coated cords, a pair of annular extending bead cores, the at least one ply being wrapped about each bead core and extending therebetween, a belt reinforcing structure, and a tread disposed radially outward of the casing, the tread having an inner tread base, two lateral edges, the distance halfway between the lateral edges define the tread equatorial plane and a plurality of lugs extending radially outwardly from the inner tread base, the tire characterized by:

the tread comprising three separated rows of lugs, a first row extending axially inwardly from a first shoulder region of the tread, a second row extending axially inwardly from a second shoulder region of the tread, and a central row positioned between the first and second rows, the lugs of the first row being similar in shape but opposite in orientation relative to the lugs of the second row, each lug in the first and second rows being divided by a first transverse bar of reduced height and connects at an inward end to a central lug by a second transverse bar of reduced height, each lug of the first row lying within a first tread half, each lug of the second row lying within a second tread half, the lugs of the central row lying in both the first tread half and second tread half;

wherein the reduced height of the first and second reduced height transverse bars is approximately ten percent (10%) of the nominal height of the lugs of the first and second rows.

2. The radial ply pneumatic tire of claim 1, wherein each shoulder lug and central lug has respective leading and trailing edges, the shoulder and central lug leading and trailing edges extending transversely across the tread pattern substantially normal to the tread edges.

3. The radial ply pneumatic tire of claim 1, wherein the leading and trailing edges of the central lugs lie on respective sides of the tread equatorial center plane.

4. The radial ply pneumatic tire of claim 1, wherein each central lug has enlarged lug head portions extending from the central lug leading and trailing edges, both the leading edge and the trailing edge of each central lug extending transverse to the tire tread and the enlarged lug head portions intersecting the equatorial center plane of the tire.

5. The radial ply pneumatic tire of claim 1, wherein each central lug leading and trailing edges are substantially parallel and axially aligned with each circumferentially adjacent central lug's respective leading and trailing ends.

6. The radial ply pneumatic tire of claim 1, wherein the tire having a relatively low net to gross ratio of less than forty percent (40%).

7. A radial ply pneumatic tire for construction/industrial/OTR applications, the tire having a casing the casing having at least one ply reinforced by rubber coated cords, a pair of annular extending bead cores, the at least one ply being wrapped about each bead core and extending therebetween, a belt reinforcing structure, and a tread disposed radially outward of the casing, the tread having an inner tread base, two lateral edges, the distance halfway between the lateral edges define the tread equatorial plane and a plurality of lugs extending radially outwardly from the inner tread base, the tire characterized by:

the tire having a relatively low net to gross ratio of less than forty percent (40%) and a relatively low aspect ratio ranging from 50% to 75%;

the tread comprising three separated rows of lugs, a first row extending axially inwardly from a first shoulder region of the tread, a second row extending axially inwardly from a second shoulder region of the tread, and a central row positioned between the first and second rows, the lugs of the first row being similar in shape but opposite in orientation relative to the lugs of the second row, each lug of the first and second rows is divided by a first reduced height transverse bar and connects at an inner end to a central lug by a second transverse bar of reduced height, each lug of the first row lying within a first tread half, each lug of the second row lying within a second tread half, the lugs of the central row lying in both the first tread half and second tread half, and wherein the reduced height of first and second transverse bars is approximately ten percent (10%) of the nominal height of the lugs within the first and second rows.

8. The radial ply pneumatic tire of claim 7 where the central lug is elongate having a centerline, the central lug has enlarged lug head portions extending from a substantially planar leading edge and a substantially planar trailing edge, both the leading edge and the trailing edge of each central lug lying at opposite ends of the lug centerline and extending transverse to the tire tread and the enlarged lug head portions intersecting the equatorial center plane of the tire.

9. The radial ply pneumatic tire of claim 7 wherein the net-to-gross ratio as measured around the circumference of the tire is about thirty-six percent (36)%.

10. The radial ply pneumatic tire of claim 7 wherein the belt reinforcing structure is comprised of at least one steel reinforcement belt.

11. A radial ply pneumatic tire for construction/industrial/OTR applications, the tire having a casing the casing having at least one ply reinforced by rubber coated cords, a pair of annular extending bead cores, the at least one ply being wrapped about each bead core and extending therebetween, a belt reinforcing structure, and a tread disposed radially outward of the casing, the tread having an inner tread base, two lateral edges, the distance halfway between the lateral edges defines the tread equatorial plane and a plurality of lugs extending radially outwardly from the inner tread base, the tire characterized by:

the net-to-gross ratio as measured around the circumference of the tire is less than forty percent (40%) and the tire has a relatively low aspect ratio substantially ranging from fifty percent to seventy-five percent;

wherein the tread comprises three separated rows of lugs, a first row extending axially inwardly from a first shoulder region of the tread, a second row extending axially inwardly from a second shoulder region of the tread, and a central row positioned between the first and second rows, the lugs of the first row being similar in shape but opposite in orientation relative to the lugs of the second row, each lug of the first and second rows being divided by a first reduced height transverse bar and connects at an inward end to a central lug by a second transverse bar of reduced height, each lug of the first row lying within a first tread half, each lug of the second row lying within a second tread half, the lugs of the central row lying in both the first tread half and second tread half and wherein the reduced height of the first and second reduced height transverse bars is approximately ten percent (10%) of the nominal height of the lugs within the first and second rows.

12. The radial ply pneumatic tire of claim 11 where the central lug is elongate having a centerline, the central lug has enlarged lug head portions extending from a substantially planar leading edge and a substantially planar trailing edge, both the leading edge and the trailing edge of each central lug lying at opposite ends of the central lug centerline and extending transverse to the tire tread and the enlarged lug head portions intersecting the equatorial center plane of the tire.

13. The radial ply pneumatic tire of claim 11 wherein the tire has a net-to-gross ratio as measured around the circumference of the tire is about thirty-six percent 36%.

\* \* \* \* \*